United States Patent
Vollmar

(10) Patent No.: US 9,013,157 B2
(45) Date of Patent: Apr. 21, 2015

(54) PHASE-FIRED CONTROL ARRANGEMENT AND METHOD

(75) Inventor: Wilfried Vollmar, Soest-Deiringsen (DE)

(73) Assignee: Sitec GmbH, Burghausen (DE)

(*) Notice: Subject to any disclaimer, the term of this patent is extended or adjusted under 35 U.S.C. 154(b) by 646 days.

(21) Appl. No.: 13/133,598

(22) PCT Filed: Jul. 8, 2009

(86) PCT No.: PCT/EP2009/058674
§ 371 (c)(1),
(2), (4) Date: Aug. 5, 2011

(87) PCT Pub. No.: WO2010/049185
PCT Pub. Date: May 6, 2010

(65) Prior Publication Data
US 2011/0285364 A1     Nov. 24, 2011

(30) Foreign Application Priority Data
Dec. 9, 2008 (DE) .......................... 10 2008 060 907

(51) Int. Cl.
*H02M 5/12* (2006.01)
*H02M 5/257* (2006.01)
(Continued)

(52) U.S. Cl.
CPC *H05B 39/08* (2013.01); *G05F 1/20* (2013.01); *H02M 5/12* (2013.01); *H02M 5/257* (2013.01)

(58) Field of Classification Search
CPC ..... H02M 5/257; H02M 5/2573; H02P 13/06; G05F 1/20; H05B 39/08
USPC ......... 323/239, 241, 246, 258, 322, 324, 325, 323/343, 345
See application file for complete search history.

(56) References Cited

U.S. PATENT DOCUMENTS 3,619,765 A * 11/1971 Wood ............................ 323/258
3,921,059 A * 11/1975 Birman et al. ................ 323/266
(Continued)

FOREIGN PATENT DOCUMENTS

| CN | 101232250 A | 7/2008 |
|---|---|---|
| EP | 1638196 A2 | 3/2006 |
| JP | S53136647 A | 11/1978 |
| JP | S5626849 B2 | 6/1981 |
| JP | 2001273040 A | 10/2001 |

OTHER PUBLICATIONS

International Search Report for PCT/EP2009/058674 dated Nov. 30, 2009.
(Continued)

*Primary Examiner* — Fred E Finch, III
(74) *Attorney, Agent, or Firm* — Heslin Rothenberg Farley & Mesiti P.C.

(57) ABSTRACT

A method and arrangement for phase-fired control is provided, in which all controllable electric switching elements are linked by a common controller that has a first input for a first control signal. A set point value is pre-defined as a first input variable and assigned to a device for controlling the controllable electric switching elements. Current flowing through each switching element is measured and transmitted to the device for controlling the switching elements as a respective second input variable. The current value of the voltage in the load is measured and transmitted to the device for controlling the switching elements as a third input variable. The device for controlling the switching elements controls all switching elements in a targeted manner by use of the first, second and third input variables. A maximum of two switching elements are active at any one time.

8 Claims, 3 Drawing Sheets

Figure 1:
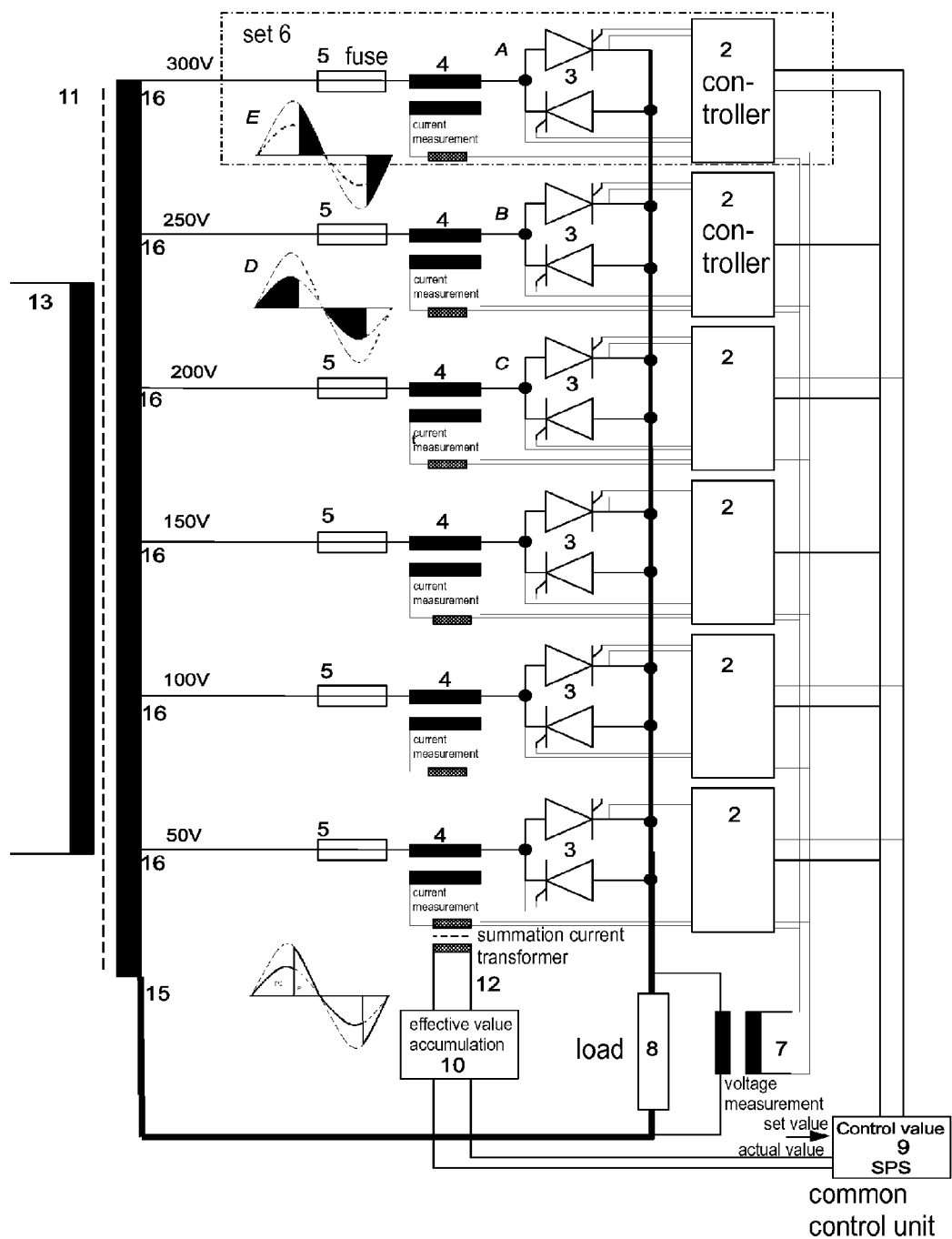

(51) Int. Cl.
*H05B 39/08* (2006.01)
*G05F 1/20* (2006.01)

(56) References Cited

U.S. PATENT DOCUMENTS

| | | | | |
|---|---|---|---|---|
| 4,860,145 | A * | 8/1989 | Klingbiel | 361/18 |
| 5,210,685 | A | 5/1993 | Rosa | |
| 5,408,171 | A * | 4/1995 | Eitzmann et al. | 323/258 |
| 5,786,684 | A * | 7/1998 | Bapat | 323/258 |
| 5,825,164 | A * | 10/1998 | Williams | 323/255 |
| 5,969,511 | A * | 10/1999 | Asselman et al. | 323/258 |
| 6,465,911 | B1 | 10/2002 | Takeda et al. | |
| 8,333,265 | B2 * | 12/2012 | Kang et al. | 187/289 |
| 2001/0024111 | A1 * | 9/2001 | Suzuki | 323/255 |

OTHER PUBLICATIONS

D. Gregory, et al., "The Static Transfer Switch Operational Considerations", Proceedings in the 14th International Symposium on Power Semiconductor Devices and ICS, Power Electronics, Machines and Drives, Apr. 16-18, 2002, pp. 620-625.

D. Gregory, et al; "The Static Transfer Switch Operational Considerations," Proceedings of the 14th. International Symposium on Power Semiconductor Devices & ICS. ISPSD '02. Santa Fe, NM, Jun. 4-7, 2002; [International Symposium on Power Semiconductor Devices & IC's], New York, New York; Jun. 4, 2002, pp. 620-625.

Examination Report issued in corresponding Japanese patent application No. 2011-539972 dated Aug. 6, 2013.

* cited by examiner

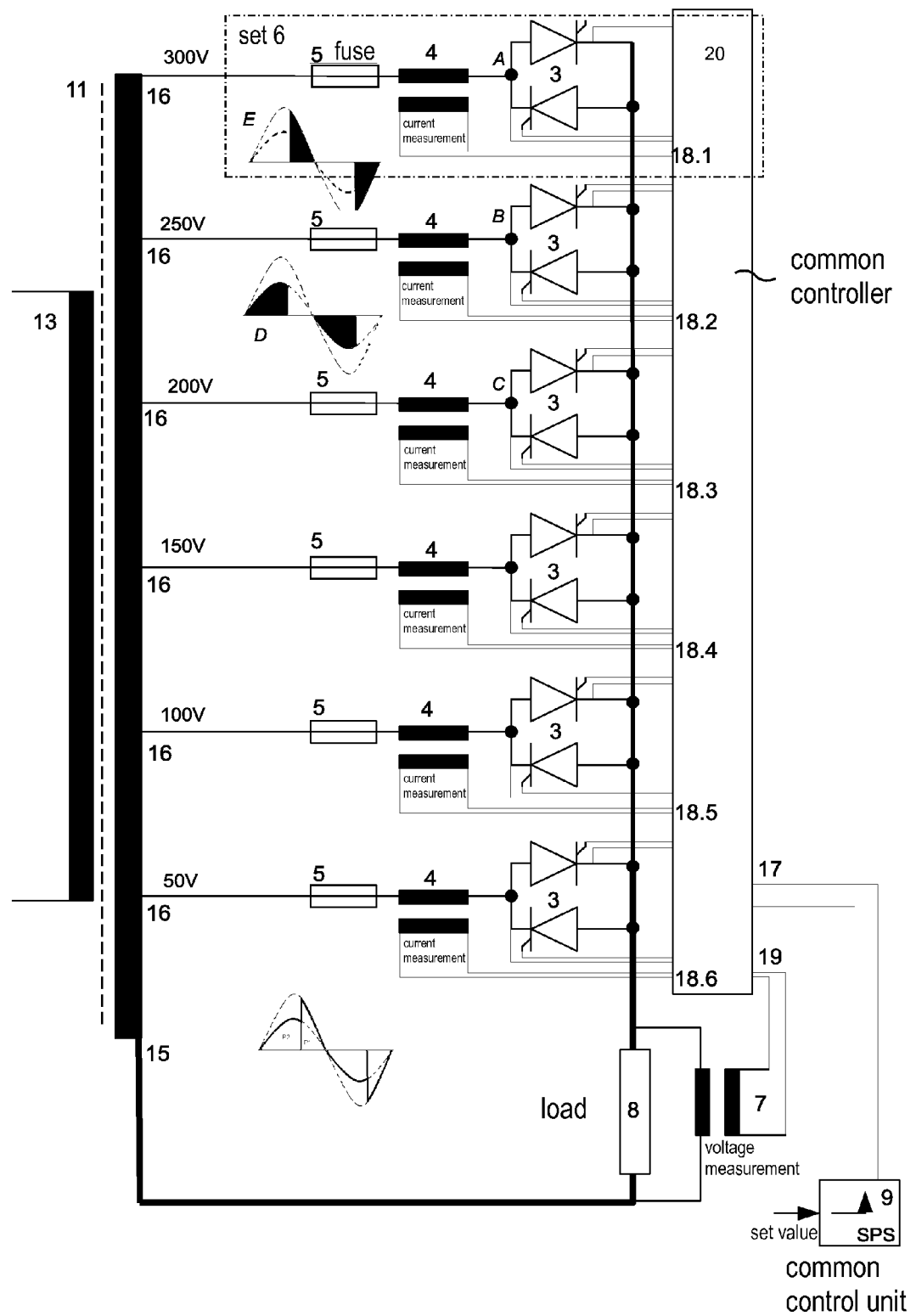

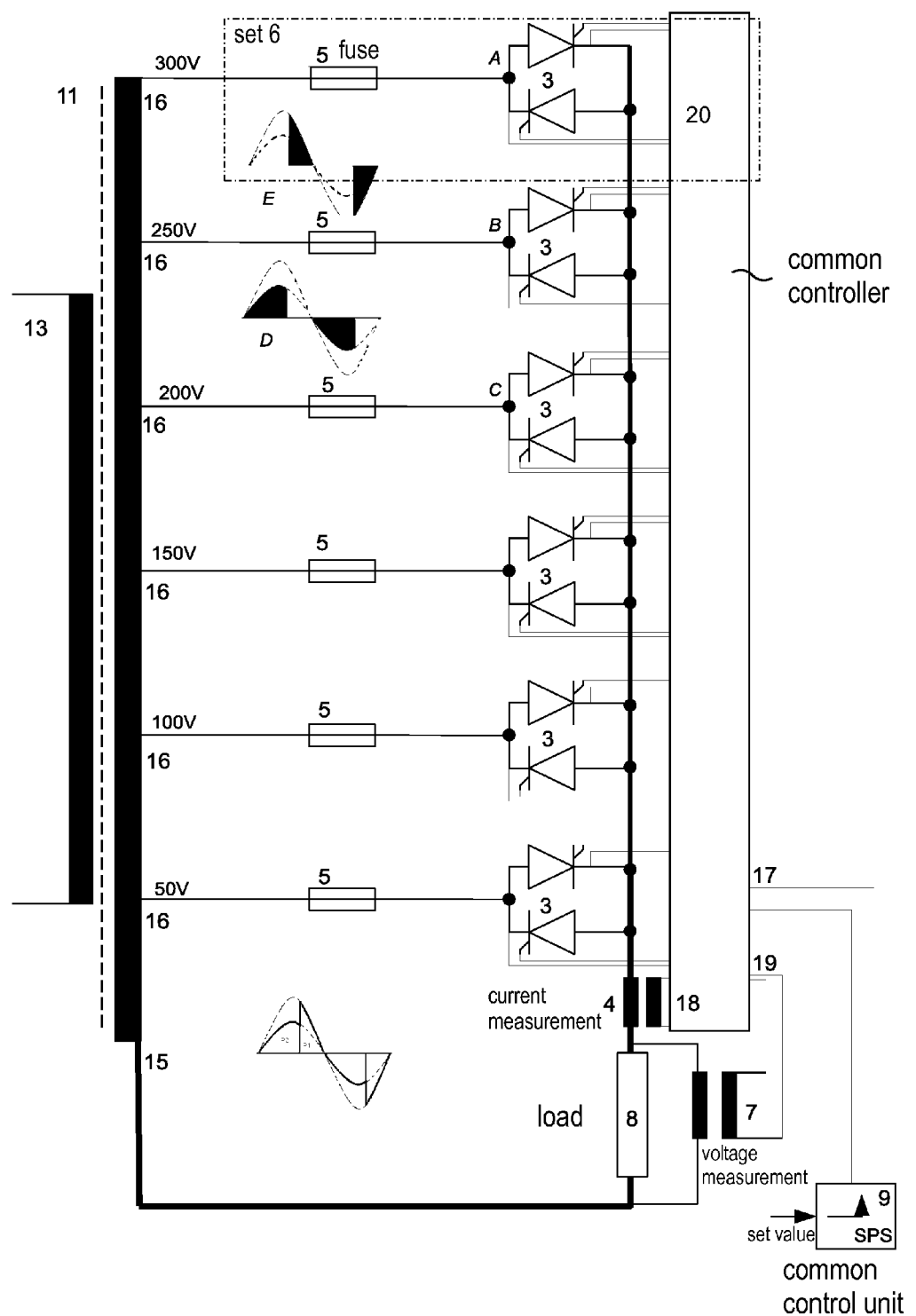

PHASE-FIRED CONTROL ARRANGEMENT AND METHOD

CROSS REFERENCE TO RELATED APPLICATIONS

This application is a national stage filing under section 371 of International Application No. PCT/EP2009/058674 filed on Jul. 8, 2009, and claims priority of German application No. 10 2008 060 907.2 filed on Dec. 9, 2008, the entire disclosure of these applications being hereby incorporated herein by reference.

BACKGROUND ART

The invention relates to an arrangement and procedure for phase-fired control, particularly for thermal engineering, with a transformer that has a primary and a secondary coil for generating voltage, where the secondary coil has an end and at least two taps, where a controllable electrical switching element is connected to each tap. The controllable electrical switching element is connected to a first connection of a load and a second connection of the load is connected to the end of the secondary coil.

The invention also relates to a phase-fired control procedure where the set value is specified for an electrically controllable load and is controlled by hooking up or switching off multiple switching elements that can be controlled at the same time, which are arranged between an alternator and the load in an electrical circuit and which work in a phase-fired method.

There are many well-known phase-fired control units from a technical standpoint, for example, a dimmer switch for controlling the voltage and thus the brightness of a light bulb.

Furthermore, the so-called phase-fired controllers are also well known as performance controllers, which are used in thermal engineering.

They are available under various product names like Thyrovar (AEG), Sirius (Siemens), Reotron (REO), Optron, Eurotherm, Thermocon, Tematec, Dietz, etc.

For a special area, multiple thyristor units are needed for the controller circuits that are partially set, also known as voltage sequence control, specifically between two and six units, controlled with an individual switch, which generate the thyristor control impulses. The voltage is thus controlled with a phase gate, which does not change the frequency of the voltage.

Such arrangements have the advantages of the phase gate process and simultaneously reduce the network reaction effects.

Switches of this type have been available in the market since the 1970's. Additional controls of a phase-fired control are connected to a control unit via a bus structure or through multiple connections with each other.

This additionally results in added costs in terms of the joining technology for the electrical connection of individual control elements that are quite high for the controllers and/or control units, as well as testing costs for a function control while manufacturing the devices.

The invention thus has to specify an underlying phase-fired control which reduces the production and functional control costs and expenses.

BRIEF SUMMARY OF INVENTION

According to the invention, the task for the arrangement is solved with a phase-fired control of the input type in that all the controllable electrical switching elements are connected with a common controller, which has a first input as its first control signal.

As opposed to the state of the art technology, the controllable electrical switching elements are connected to an individual common control cable with its own controller. This common controller generates the control signals necessary for controlling all electrical switching elements on the basis of the already set input values. To this effect, the controller has a first input for a control signal, with which the superior control unit receives a control signal, which either corresponds to a set current that flows through the load, or to a set voltage that is to be applied on the load.

The controllable electrical switching elements to be controlled are selected with the controller and its control is selected with a control signal generated by the controller. Then the control process takes place when one or maximum two controllable electrical switching elements are simultaneously active, i.e., controlled with a control signal of the controller. Active means that current is flowing through the corresponding controllable electrical switching element at least time-wise. In terms of the inactive controllable electrical switching elements, the controller operates by generating an appropriate control signal so that no current is flowing through the control device.

An initial embodiment is provided with a fuse arranged in the sequence of the electrically controllable switching element.

Between a tap of the secondary coil of the transformer and the corresponding controllable electrical switching element, an in-line fuse is interconnected for protecting the transformer in the event of a short circuit in the controllable electrical switching elements.

A special embodiment is provided with an ammeter arranged in line with the controllable electrical switching element and the ammeter is connected to a corresponding second input of the controller.

For example, an ammeter is interlinked between the in-line fuse and the controllable electrical switching element, which determines the current flowing through the controllable electrical switching element. The ammeter is connected to the controller via the lines, which has a corresponding second input for each ammeter.

Yet another embodiment is provided with an ammeter arranged in line for the load and it is connected to a corresponding second input of the controller.

Alternately, the ammeter can, for example, be interconnected between the controllable electrical switching elements and the load. In this embodiment, the precision of the ammeter is lower as compared to using an ammeter for each switching element, but is sufficient for many applications. The application of each individual ammeter is possible according to the invention, since the controller has information about the currently active switching element and the measured current value can be precisely associated with one unit.

An embodiment is provided with a voltmeter connected parallel to the load, and the voltmeter is connected to a third input of the controller.

The current voltage on the load is measured using a voltmeter that is parallelly connected to this load. The voltmeter is connected by its lines to a third input of the controller.

A simple embodiment is provided with an ammeter and/or the voltmeter, which acts as a carrier that has a primary and secondary coil and serves for voltaic decoupling. In this case, the current value and/or the voltage value is determined in the controller, which is equipped with suitable measurement devices. Only two measuring devices are required for the current measurements that need to be made, regardless of the number of controllable electrical switching elements, since a maximum of two controllable electrical switching elements are active simultaneously. The connection between a measurement device and a second input to be measured is implemented via a line transformer, where the multiplexer is controlled by a switch, which selects the controllable electrical switching element to be controlled.

In a special embodiment, there is a provision for equipping the controllable electrical switching elements by two nonparallel connected thyristors.

In yet another design, there is a provision for equipping the controllable electrical switching elements with a Triac.

A controllable electrical switching element can be added with two thyristors connected antiparallel or a triac, where the control lines are connected to the controllers which generate the thyristor or triac control impulses.

According to the invention, this procedure is enabled with a phase-fired control of the input as per the mentioned type in that the set value of a device for controlling the controllable electrical switching element is specified as an input value and the current flowing through a controllable electrical switching element is measured and transmitted as a third input value to the device for controlling the controllable electrical switching element. Additionally, the device for controlling the controllable electrical switching elements controlled by the first, second and third input values, controls all controllable electrical switching elements, where a maximum of two controllable electrical switching elements are simultaneously active.

A means for controlling the controllable electrical switching elements is given an input value, which corresponds to a target current flowing through the load or to an input voltage that is to be applied on the load. The current flowing through the controllable electrical switching element is measured and given to the controller as the second input value. The voltage is determined as the third input value using the load and provided to the controller as a third input value.

Controlled by the first input variable, which corresponds to a specified expected value, the controller selects the measured current values and the measured voltage values, which are required for achieving the target specifications and which generate the control impulses required for the phase-fired control.

BRIEF DESCRIPTION OF DRAWING FIGURES

The solution will be explained in further detail using an execution example. The respective illustrations show FIG. 1 an example of an arrangement for phase-fired control as per the state of the technology FIG. 2 an initial embodiment of the arrangement as per the invention for phase-fired control and FIG. 3 an initial embodiment of the arrangement as per the invention for phase-fired control

DETAILED DESCRIPTION

The analysis of the circuit arrangement according to FIG. 1 shows the drawback of the existing state of the technology, which is that one or maximum two switches of a phase-fired control are simultaneously being used. Consequently, at least two controllers are locked in the event of, for example, a phase-fired control consisting of four controllers. Typically, the controllers 2, which control the controllable electrical switching elements 3 like thyristors or Triacs 3, are controlled by a common control unit 9, for example, a PLC (programmable logic controller).

The solution as per the invention according to FIG. 2 proposes using only a control unit 9 (PLC) and a common controller 20 for all controllable electrical switching elements 3 of the phase-fired control. The control unit 9 (SPS) only provides to the controller 2 the target value for the predetermined electric parameter to be controlled. On the other hand, according to the existing state of the technology, a control value is generated for each controller 2 for the electrically controllable switching element 3 that is controlled by the controller 2. (FIG. 1)

Using this common controller 20, only the required controllable electrical switching element 3 can be selected and controlled. Since the common controller 20 selects and controls the controllable electrical switching elements 3 automatically, no communication of any kind is required between control unit 9 and the common controller 20.

The system does not require any additional direct control components or transducer since all the information required by controller 2 like the value to be set for the controllable electrical switching element 3, the actual current and voltage values are known.

Since there appears to be no problem controlling both power units simultaneously, three kits are simultaneously provided, requiring only the number of connections for the control and alternating current technology to multiply and an internal interlocking device to be added.

In FIG. 1, a phase-fired control unit is seen, which clasps six individual controllers 2. Each controller 2 is connected to one controllable electrical switching element 3 each, which is made using two antiparallel connected thyristors. The thyristors are controlled by the control signals of the corresponding controller 2. Additionally, each controller 2 is connected to a corresponding device for measuring current 4 using a second input each. A in-line fuse 5 is controlled between the thyristors and a related tap 16 of the transformer 11. These components of the circuit are integrated in a so-called set 6.

The circuit arrangement contains six such sets 6, where each controller 2 has three additional inputs next to the inputs for connecting with a common device for measuring voltage 7, apart from the inputs for connecting to a dedicated device for measuring current 4, which determines the current voltage to actuate to load 8.

Additionally, FIG. 1 shows a control unit 9 in the form of a PLC for controlling the six controllers 2 and a device for effective value accumulations 10 that is connected to a summation current transformer 12 and to the control unit 9.

A transformer 11 is provided for providing the voltage required on the load 8, which has a primary coil 13 and secondary coil 15 that has multiple taps 16. FIG. 1 shows the taps 16 for the voltages 50 V, 100 V, 150 V, 200 V, 250 V and 300 V where each tap 16 is allocated a set 6.

Subsequently, the functionality of the switching arrangement of the state of the art technology is shown in FIG. 1. In the example, the control cycle is described when sets B and A change to Sets C and B.

The assumptions are specified, that the set 6 A, indicated with the letter A and with a control angle of 110°, and the set 6 B indicated with the letter B work with the so-called full duty cycle, at which begins the current flow with the zero crossing of the positive half cycle of the voltage on the tap "250 V".

Thus begins the current flow through the load in the first positive half cycle with the zero point, controlled by the set 6 B, as shown in the section drawing D.

The section drawings D and E each show a voltage time curve for a full sinusoidal oscillation. The section drawings show one sinusoidal oscillation each with amplitude of 300 V corresponding to the voltage of the tap 16 with a voltage specification of 300 V and one sinusoidal oscillation each with an amplitude of 250 V corresponding to the voltage of the tap 16 with the voltage specification of 250 V. The current flow executed through the corresponding set 6 is shown in the section drawing and indicated with the section of a half-wave that is colored black.

At the point of 110°, there is a switch from set 6 B to set 6 A, as shown in section drawing E, where the flow of current has stopped in the positive half cycle with the voltage zero crossing at 180°. The current flow in the negative half cycle begins analogous to that illustrated above, with the zero crossing of the voltage in the negative half cycle controlled by set 6 B. At a steering angle of 110° for the negative half cycle, there is a switch to set 6 A, until the end of the negative half cycle is reached.

The control data relating to the control angle required for control is transmitted to the controllers 2 by a control unit 9 of a PLC via a bus system, for example, a pro-bus.

Current is measured in individual batches 6. Additionally, a sum and total current is determined using a summation current transformer 12, which is connected to an arrangement for effective value accumulation 10.

Using an arrangement for effective value accumulation 10, an actual value is generated and transmitted to the control unit 9 as a normal signal or actual value via a circuit. Based on this measured value (recycled value), the signals are compared to the specified target value, which is generated by a superior equipment that is not illustrated, which calculates the corresponding control angle for controller 2 and transmits a control signal to the appropriate controller 2 that has to be controlled.

An additional circuit that is likewise not shown, blocks the control impulses in such a way that the outgoing control signal of controller 2 in set 6 B is locked at an angle of 180° in order to avoid triggering the controller 2 in the negative phase. The controller 2 is designed as a standard control unit for a duty cycle of 0°-180°.

The direct current circuit of the respective ammeter 4 for the corresponding controller 2 is required for a quick set current limiting, since control unit 9 cannot fulfill this functionality by itself with its conversion speed. Control unit 9 checks the status of the disconnected controller 2 and evaluates the status and error messages.

If the output voltage (output current) that is on Load 8 needs to be reduced, because, for example, the temperature is too high, the control angle for controller 2 of the set 6 A is increased, for example from 110 to 160. This increase in the control angle is possible only up to 180° for the thyristors 3, since there is no duty cycle and thus no current flow in the total half cycle anymore.

At a control angle of 180°, controller 2 is switched off but is still operational. The total current now flows only via electrical switching element 3 that is controlled by controller 2 of set 6 B.

In this case, if a full recording level is achieved, no harmonies are created.

If the output voltage on load 8 has to be reduced, controller 2 of set 6 A is locked from control unit 9 and controller 2 of set 6 C is released. The current starts to flow through set 6 C with zero crossing of the voltage starting in the positive half wave. Within this half oscillation, there is a switch to the set 6 B on achieving the specified control angle.

Individual actions of control unit 9 are required for implementing this control cycle in order to control the three controllers 2 that call on the respective multiple circulation times of the control unit 9.

Subsequently, the sequence is shown using the solution as per the invention. (FIG. 2)

The same assumptions apply here, that the set 6 A, indicated with the letter A and with a control angle of 110°, and the set 6 B indicated with the letter B work with the so-called full recording level, at which begins the current flow with the zero crossing of the positive half cycle of the voltage on the tap "250 V".

Thus begins the current flow in the first positive half cycle with the zero crossing, controlled by the Set 6 B, as shown in diagram D. At the point 110°, there is a switch from Set 6 B to Set 6 A as shown in diagram E where the current flow ends in the positive half cycle with the zero crossing of the voltage at 180°. The current flow in the negative half cycle begins analogous to that illustrated above with the zero crossing of the voltage in the negative half cycle controlled by the Set 6 B. At a steering angle of 110° of the negative half cycle there is a switch to the Set 6 A until it reaches the end of the negative half cycle.

A common controller 20 is provided for all controllable electrical switching elements 3 in the circuit arrangement as per the invention. The controllable electrical switching elements 3 are designed as thyristors in the example.

Only the target value is specified by the control unit 9 to the common controller 20. The controller 20 evaluates the values of the ammeter 4 and the voltage meter 7 itself, determines the steering angle for the required sets 6 and generates the control signals for the thyristors.

For this reason, common controller 20 is connected to the control unit 9 via a first input 17, via two inputs 18.1 to 18.6 with a corresponding ammeter and connected to the voltage meter 7 with a third input 19. In the example illustrated in FIG. 2, the ammeters 4 and voltage meter 7 shown as the transmitter via the load 8 and the currents and voltage are measured within the common controller 20 by components that are not shown.

Since only a maximum of two set 6 work simultaneously, only two current measurements of the corresponding ammeter 4 should be charted. Thus, only two transducers are provided for measuring the current in the common controller 20. Those two inputs 18.1 to 18.6 of the common controller 20 for the connected ammeter 4 are interconnected to the two internal transducers via a suitable yet not illustrated multiplexer in the common controller 20. These transducers belong to the sets 6 and should be used.

Assuming the output criteria, are the ammeters 4 of the set 6 A and B. [sic] In this design form as per the invention, the summation current transformer 12 as well as the arrangement for effective value accumulation 10 can be left out.

Releasing the current inputs to the internal transducer, which generates a digital value from the analog signal as an AD converter, and gives the output signals, are internally coupled so that only the set 6 that is presently carrying current or is active, in which the thyristors are controlled, is recorded using a measuring device.

Non-linearity of the graph of the switching elements (thyristors, triac) is compared using an algorithm. Control unit 9 only gives the common controller 20 a target value, while the actual arrangement to sets 6 is done automatically by the logic of the common controller 20. Thus, fewer status messages and error messages have to be used which have to be transmitted to the control unit.

Furthermore, the lag times that are limited by the processing time of the control unit and can, for example, lie on a scale of 100 ms, need not be considered.

Additional interlocking circuits as well as adhering to the cycles determined by the net frequency (20 ms) need not be ensured any more.

FIG. 3 shows the second option for arrangement for phase-fired control. It is different from the arrangement shown in FIG. 2, in that the current is not measured using an ammeter 4 that is arranged in each set 6 but using a single ammeter 4. In the current load circuit of load 8, this is arranged, e.g. between the electrically controllable switching elements 3 and load 8.

Measuring the current in this manner is possible as per the invention since common controller 20 controls switching element 3 and thus has information about the switching element 3 that is presently active. The current measured at a particular time can thus be assigned to the switching element 3 active at said time and stored at said time.

The invention claimed is:

1. An arrangement for phase-fired control, as performance controller for thermal engineering without change of frequency of voltage, with a transformer containing a primary and secondary coil for generating voltage, wherein the secondary coil has an end and at least two taps, and a controllable electrical switching element is connected at each tap and each controllable electrical switching element is connected to a first connection of a load, and a second connection of the load is connected to the end of the secondary coil, and all controllable electrical switching elements are connected with and controlled by a single common controller, and the common controller has a first input for receiving a control signal corresponding to a target value of a set current flowing through the load or a set voltage to be applied to the load and is configured to automatically select two controllable electrical switching elements to be simultaneously active and controlled by the common controller, the common controller determining a steering angle, and generating phase-fired control signals to switch over from a first to a second of the two controllable electrical switching elements at an arbitrary control angle of the current flowing through an active controllable switching element depending on the target value, and an ammeter arranged in series between a tap and an active controllable electrical switching element or between the active controllable electrical switching element and the load, the ammeter being connected with a second input of the common controller, and the common controller measuring current at the second input flowing only through an active controllable electrical switching element.

2. Arrangement according to claim 1, wherein a fuse is arranged in line with the controllable electrical switching element.

3. Arrangement according to claim 1, wherein a voltage meter is connected parallel to the load and the voltage meter is connected with a third input of the controller.

4. Arrangement according to claim 1, wherein at least one controllable electrical switching element comprises two anti-parallel connected thyristors.

5. Arrangement according to claim 1, wherein at least one controllable electrical switching element comprises a triac.

6. The arrangement according to claim 1, wherein the common controller includes only two current measuring devices, regardless of number of controllable electrical switching elements in the arrangement, and the two current measuring devices are selectively connected by the common controller to a second input of only the active controllable electrical switching element.

7. The arrangement according to claim 1, with a single ammeter connected between the electrically controllable switching element and the load, and wherein current measured at a particular time is assigned by the common controller to the controllable switching element active at said time.

8. A method for phase-fired control, wherein a target set value of a controllable electrical variable is specified for a load and is controlled by switching multiple parallel connected controllable electrical switching elements on or off, the switching elements are arranged in a current circuit between an alternating current generator and the load and operate with a phase-fired process in which two controllable electrical switching elements are simultaneously active, the target set value is specified to a single common controller for controlling the controllable electrical switching elements as a first input value, current flowing only through an active controllable electrical switching element at any point of time is measured by an ammeter arranged in series between the alternating current generator and an active controllable switching element or between the active controllable switching element and the load and transmitted to the common controller as a second input value, voltage on the load is measured and transmitted to the common controller as a third input value, and the common controller controlled by the first, second and third input values controls all controllable electrical switching elements to automatically select two controllable electrical switching elements to be simultaneously active and controlled, to determine a steering angle and to generate phase-fired control signals to switch over from a first to a second of the two controllable electrical switching elements at an arbitrary control angle of current flowing through an active controllable switching element depending on the target set value.

* * * * *